(No Model.)
C. C. HIGHAM.
BALANCE SPRING FOR BRAKE HEADS.
No. 417,181. Patented Dec. 10, 1889.
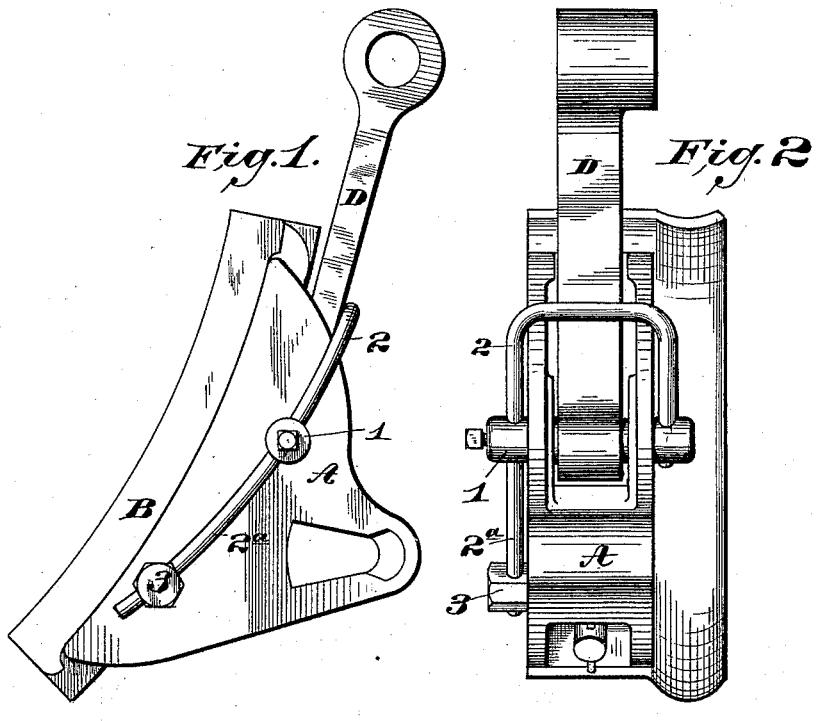
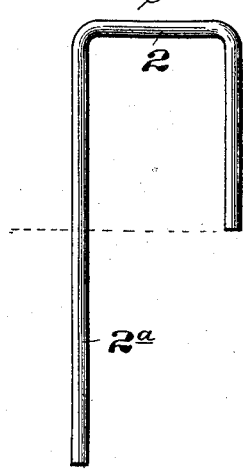
Scale 3" = 1'
Witnesses:
E. T. Walker
Alys. Scott
Inventor:
Charles C. Higham
by F. W. Ritter Jr
Atty

UNITED STATES PATENT OFFICE.

CHARLES C. HIGHAM, OF ST. LOUIS, MISSOURI, ASSIGNOR TO THE WESTINGHOUSE AIR BRAKE COMPANY, OF PITTSBURG, PENNSYLVANIA.

BALANCE-SPRING FOR BRAKE-HEADS.

SPECIFICATION forming part of Letters Patent No. 417,181, dated December 10, 1889.

Application filed October 18, 1889. Serial No. 327,421. (No model.)

*To all whom it may concern:*

Be it known that I, CHARLES C. HIGHAM, a citizen of the United States, residing at St. Louis, in the State of Missouri, have invented certain new and useful Improvements in Balance-Springs for Brake-Heads; and I hereby declare the following to be a full, clear, and exact description of the same, reference being had to the accompanying drawings, in which—

Figure 1 is a side elevation of a brake-head, its hanger, and a balance-spring for the head embodying my invention. Fig. 2 is a rear view of the same. Fig. 3 is a detached view of the balance-spring. Fig. 4 is a detached view of the hanger-pin. Fig. 5 is an end view thereof. Fig. 6 is a detached view of the stud for securing the end of the balance-spring.

Like symbols refer to like parts wherever they occur.

My invention relates to the construction and application of balance-springs for brake-heads, or to that class of devices which are applied to brake-heads having movable connection with the brake-beams or operating-lever to prevent the tilting, sagging, or rocking of the head and insure the proper position of the head not only when the brakes are applied, but also when not applied. The device heretofore used for this purpose has usually been a spring or springs connected either with the beam or with the brake-lever, so that the tension or power of the spring varied with every change of relation between the brake head and beam or brake-lever, which was an objectionable feature.

The object of the present invention is, first, so to construct and apply the balance-spring that its tension shall be independent of the position of the brake-beam or brake-lever by which the brake-head is operated, and, second, so to construct and apply said balance-spring that it can be applied, adjusted, or removed without disturbing the connection between the brake-head and brake beam or lever by which the head is operated.

The principal feature of the invention is embodied in a yoke or U-shaped balance-spring having its ends secured to the brake-head and arranged to bear on the hanger or lever which carries or sustains the brake-head.

Subordinate features of the invention are, first, the utilization of the balance-spring as a cotter for the hanger-pin where the brake-head is lever supported or suspended, and, second, in combining with the balance-spring a movable stud for securing and adjusting the balance-spring.

There are other minor features of invention, all as will hereinafter more fully appear.

For purposes of illustration I have chosen to show the invention applied to a hanger-suspended lever-operated brake-head similar to that described in the patent of G. H. Poor No. 402,276, dated April 30, 1889; but I do not intend to limit the scope of my invention thereto, as it can be readily applied by the skilled mechanic to many known forms of lever-supported brake-heads, as well as to forms of beam-operated brake-heads.

I will now proceed to describe my invention, so that others skilled in the art to which it appertains may apply the same.

In the drawings, A indicates a brake-head, which may be operated by a brake-lever, brake-beam, or in any suitable manner; B, the shoe thereof, and D a link or hanger for suspending the same. In lieu of the hanger D, its equivalent—a lever-support—may be employed.

1 indicates a pivotal connection between the brake-head and hanger D; 2, a balance-spring embodying my invention, and 3 a movable stud for securing the balance-spring. The balance-spring 2 is a bent yoke, or of general U shape of sufficient width between the verticals or arms of the U to admit the brake-head A, and preferably made with one of its arms or verticals $2^a$ extended or longer than the other, so as to project down near the toe or lower end of the break-head. If desired, both arms of the U may extend down, as shown in Fig. 1; but there is no special necessity for it. It is, however, desirable that both arms of the U-spring shall be sufficiently long to extend beyond the hanger-pin 1 and serve as cotters therefor. The hanger-pin 1 (or its equivalent) may have a head at one end and a pin-hole at the other; but I prefer to construct it with two transverse pin-holes $1^b$ $1^c$ near its opposite ends, said holes of sufficient size to receive the parallel arms of the U-shaped balance-spring 2, which act as cotters for the pin. The end of the hanger-pin has an axial opening which intersects one of the transverse pin-holes, said axial opening properly threaded to receive a set-screw 4, which secures the balance-spring to the hanger-pin 1, and consequently to the brake-head.

3 indicates a stud for steadying the balance-spring, said stud provided with an opening or eye $3^d$, through which passes one arm (usually the extension $2^a$) of the balance-spring. In order that this stud 3 may be changed from place to place to adjust or vary the position of the balance-spring 2, I prefer to construct it in the form of a screw, as shown, in which case a hole can be drilled at any desired point or place in the brake-head A and tapped or threaded to receive the movable stud.

The balance-spring, hanger-pin, and stud being constructed substantially as hereinbefore specified, the brake-head is first secured to its hanger (or support) by means of the pivot or hanger-pin 1. The balance-spring 2 is then applied with its cross-bar back of the hanger (or equivalent support) of the brake-head, its arms or verticals being passed through the pin-holes $1^b$ $1^c$ and its extension $2^a$ through the eye $3^d$ of stud 3, stud 3 having been first secured to the brake-head at the proper point, and the parts are finally, after proper adjustment, secured by the set-screw 4 in the end of hanger-pin 1. As the balance-spring is capable of longitudinal adjustment through the hanger-pin, as well as rotary or oscillatory adjustment with the pin, it is evident that by properly setting or resetting the stud 3 the tension of the spring can be altered at will, and the spring can be adapted to different break-heads diversely supported or suspended.

Among the advantages of my invention, and especially of the construction or application of it as hereinbefore specified, are, first, that the tension of the balance-spring is independent of the position of the brake beam or lever by which the head is operated; second, the spring serves as a cotter for the hanger or support of the brake-head, which simplifies the construction, reduces the number of parts, and insures the safety of the connections, and, third, the balance-spring can be applied, adjusted, or removed and replaced without disturbing the connections between the brake-head and the bar by which the brake-head is operated.

Having thus described my invention, what I claim, and desire to secure by Letters Patent, is—

1. The combination, with a brake-head and its hanger or support, of a U-shaped balance-spring secured by its end to the brake-head and arranged to bear on said hanger or brake-head support, substantially as and for the purposes specified.

2. The combination, with a brake-head and its hanger or support, of a hanger-pin which connects the brake-head and hanger or support, said hanger-pin having a cotter-eye, and a balance-spring which passes through the hanger-pin and is secured to the brake-head, substantially as and for the purposes specified.

3. The combination, with a brake-head and its hanger or support, of a hanger-pin which connects the two, a balance-spring which passes through the hanger-pin, and a set-screw for securing the balance-spring to the hanger-pin, substantially as and for the purposes specified.

4. The combination, with a brake-head and its hanger or support, of a hanger-pin which connects the two, a balance-spring which passes through the hanger-pin, and a movable stud for receiving the arm of the balance-spring, substantially as and for the purposes specified.

5. The combination, with a brake-head and its hanger or support, of a hanger-pin which connects the two, a balance-spring which passes through eyes in the ends of the hanger-pin, a set-screw for securing the balance-spring to the hanger-pin, and a movable stud for receiving the arm of the balance-spring, substantially as and for the purposes specified.

6. The combination, with the brake-head and its support, of the U-shaped balance-spring 2, having the extended arm $2^a$, a pivoted connection between the brake-head and its support, and the movable stud 3, having an eye $3^d$, substantially as and for the purposes specified.

7. The combination, with a brake-head and its hanger or support, said parts being pivotally connected, of a U-shaped balance-spring adjustably connected with the brake-head by one of its vertical arms and arranged with its cross-bar bearing on the brake-head hanger or support, substantially as and for the purposes specified.

In testimony whereof I affix my signature, in presence of two witnesses, this 12th day of October, 1889.

CHARLES C. HIGHAM.

Witnesses:
GEO. BRAND,
WILL R. WALKER.